United States Patent
Nevarez (10) Patent No.: US 7,335,859 B2
(45) Date of Patent: Feb. 26, 2008

(54) COMBINATION TOASTER/CARAMELIZER OVEN

(75) Inventor: Roberto Nevarez, Hudson, FL (US)

(73) Assignee: Lincoln Foodservice Products, Inc., Fort Wayne, IA (US)

( * ) Notice: Subject to any disclaimer, the term of this patent is extended or adjusted under 35 U.S.C. 154(b) by 0 days.

(21) Appl. No.: 10/991,820

(22) Filed: Nov. 18, 2004

(65) Prior Publication Data

US 2005/0155495 A1   Jul. 21, 2005

Related U.S. Application Data

(60) Provisional application No. 60/520,916, filed on Nov. 18, 2003.

(51) Int. Cl.
- *A21B 1/22* (2006.01)
- *A21B 1/48* (2006.01)
- *A47J 37/08* (2006.01)
- *F27B 9/36* (2006.01)

(52) U.S. Cl. ............ 219/388; 219/386; 219/411; 99/386

(58) Field of Classification Search ............ None
See application file for complete search history.

(56) References Cited

U.S. PATENT DOCUMENTS

| | | | |
|---|---|---|---|
| 3,456,578 A * | 7/1969 | Pinsly | 99/339 |
| 3,517,605 A * | 6/1970 | Weiss et al. | 99/423 |
| 3,611,913 A * | 10/1971 | McGinley | 219/388 |
| 3,693,452 A * | 9/1972 | McGinley et al. | 99/386 |
| 3,693,536 A * | 9/1972 | Carville et al. | 99/386 |
| 4,281,594 A * | 8/1981 | Baker et al. | 99/386 |
| 4,488,480 A * | 12/1984 | Miller et al. | 99/386 |
| 4,530,276 A * | 7/1985 | Miller | 99/386 |
| 4,617,908 A | 10/1986 | Miller et al. | 126/20 |
| 5,588,354 A * | 12/1996 | Stuck et al. | 99/386 |
| 5,673,610 A * | 10/1997 | Stuck | 99/386 |
| 5,931,083 A | 8/1999 | Stangler et al. | 99/388 |
| 5,960,704 A * | 10/1999 | March et al. | 99/349 |
| 5,983,785 A * | 11/1999 | Schreiner et al. | 99/386 |
| 6,192,789 B1 * | 2/2001 | Agcaoili et al. | 99/349 |
| 6,223,650 B1 * | 5/2001 | Stuck | 99/386 |
| 6,281,478 B2 * | 8/2001 | Chandler et al. | 219/388 |
| 6,311,610 B1 * | 11/2001 | Kettman | 99/386 |

* cited by examiner

*Primary Examiner*—J. Pelham
(74) *Attorney, Agent, or Firm*—Ohlandt, Greeley, Ruggiero & Perle L.L.P.

(57) ABSTRACT

A combination toaster/caramelizer oven for treating food products comprising: a housing; at least one heating element; a removable platen; and at least one conveyor disposed opposite the platen for conveying the food products through the housing, wherein the platen is disposed between the heating element and the conveyor. Optionally, the caramelizer oven can further include at least one moisture injector that introduces moisture to the surface of the food product which is in contact with the platen.

11 Claims, 9 Drawing Sheets

COMBINATION TOASTER/CARAMELIZER OVEN

This application claims the benefit of U.S. Provisional Patent Application Ser. No. 60/520,916, filed Nov. 18, 2003, the contents of which are incorporated herein by reference.

BACKGROUND OF THE INVENTION

1. Field of the Invention

The present invention relates to a combination toaster/caramelizer oven that is capable of toasting and/or caramelizing food products. More particularly, the present invention relates to a combination toaster/caramelizer oven that is capable of toasting food products using infrared heating or, by inserting a platen between the food products, caramelizing food products. Still more particularly, the present invention relates to a combination toaster/caramelizer oven that is capable of using infrared heating for toasting food products and/or caramelizing food products that are transported on a conveyor.

2. Description of the Related Art

In the fast food industry, there is an ongoing need for rapid high quality toasting of food products. Fast food establishments have a need for toasting flat buns or flat breads of different thicknesses for sandwiches. Also, fast food establishments need to both toast food products during their breakfast operation and later caramelize the surface of food products during their afternoon and dinner operations. Due to the crowded foodservice equipment configurations of most fast food establishments, it would be highly desirable to not have to include two separate pieces of equipment, such as a separate toaster and a separate caramelizer.

The same fast food establishments may have a need to caramelize bread for sandwiches, may also need to toast muffins and pastries that are normally not caramelized. The toasting and heating of the muffins and pastries must be even and quick to meet customer expectations.

Therefore, there is a continued need to provide quick and rapid heating of food products of different types by the fast food industry. The present inventors have also discovered that there is a need for an oven which has the capability of both toasting and caramelizing food products.

SUMMARY OF THE INVENTION

A combination toaster/caramelizer oven for treating food products comprising: a housing; at least one heating element; a removable platen; and at least one conveyor disposed opposite the platen for conveying the food products through the housing, wherein the platen is disposed between the heating element and the conveyor.

Preferably, the heating element is an infrared heating element and the conveyor is an endless belt-type conveyor.

Optionally, the oven comprises at least a first conveyor and a second conveyor in spaced relationship to either the heating element and/or the platen to define first and second toasting and/or caramelizing paths, respectively. The first toasting path comprises a first product inlet and a first product outlet opposite the first product inlet and the second toasting path comprises a second product inlet and a second product outlet opposite the second product inlet. It is preferable, that the platen be disposed opposite to both the first and second conveyors.

The heating element are typically fixedly secured to an upper surface of the housing and the housing further comprises guide rails for receiving the removable platen. It is also preferable that the spacing between the conveyor and either the heating elements or the removable platen is adjustable. Also, the spacing between the first conveyor and either the heating elements or the removable platen is adjustable and wherein the spacing between the second conveyor and either the heating element or the removable platen is adjustable, wherein the first and second conveyors are adjustable independent of each other, whereby food products of differing dimensions can be either toasted or caramelized to substantially the same degree while passing through the oven at substantially the same time.

Additionally, the conveyor is in spaced relationship to either the heating elements or the platen to define a toasting and/or caramelizing path, wherein the toasting and/or caramelizing path comprises a food product inlet and a food product outlet, wherein the food product outlet is disposed at an end of the conveyor opposite to the food product inlet, and wherein the oven further comprises an outlet tray which is operably associated with the housing to receive the food products exiting the food product outlet. Optionally, the outlet tray is heated.

According to another embodiment of the present invention, the combination toaster/caramelizer oven can be angularly adjustable from a horizontal position to a vertical position.

Still yet another embodiment of the present invention provides a caramelizer oven for caramelizing food products comprising: a housing; at least one heating element; a platen; at least one conveyor disposed opposite the platen for conveying the food products through the housing; and at least one moisture injector that introduces moisture to the surface of the food product which is in contact with the platen. During operation, the conveyor is capable of pressing the food product against the platen to caramelize the food product.

The conveyor is in spaced relationship to the platen to define a caramelizing path, wherein the caramelizing path comprises a food product inlet and a food product outlet, and wherein the at least one moisture injector is disposed about that portion of the platen adjacent to the food product inlet. In this embodiment it is preferable to have the heating element embedded within the platen. The heating element heats water to form steam which is passed through the moisture injectors into the food products.

A method of caramelizing food products in an oven having at least one heating element and a platen, the method comprising: conveying food products through the oven along a toasting path; providing moisture (e.g., steam) to the food products; and caramelizing the moisture laden food products by contacting a surface of the food products with the platen which has been heated via the heating element.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
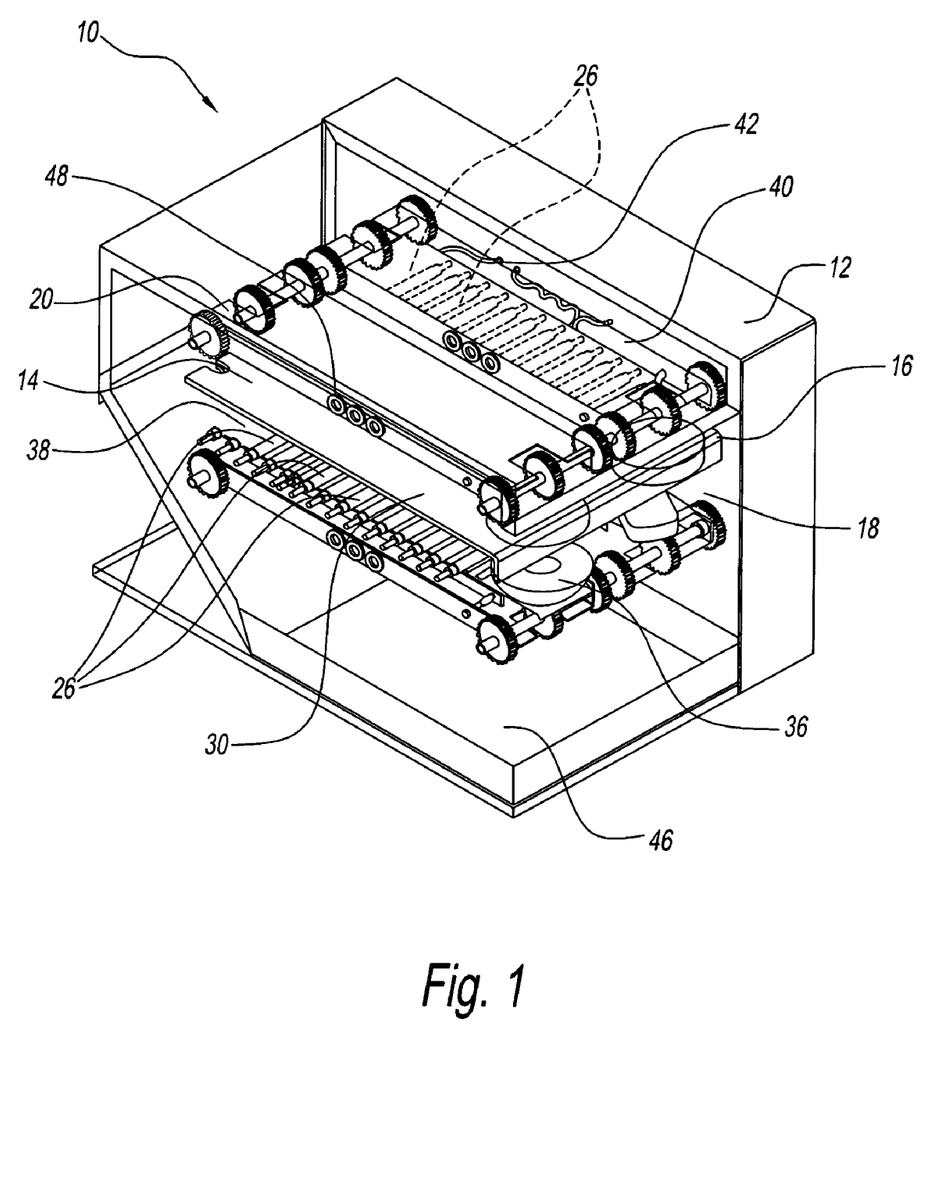
FIG. 1 is a perspective view of a first embodiment of the combination toaster/caramelizer oven of the present invention.
Figure 2:
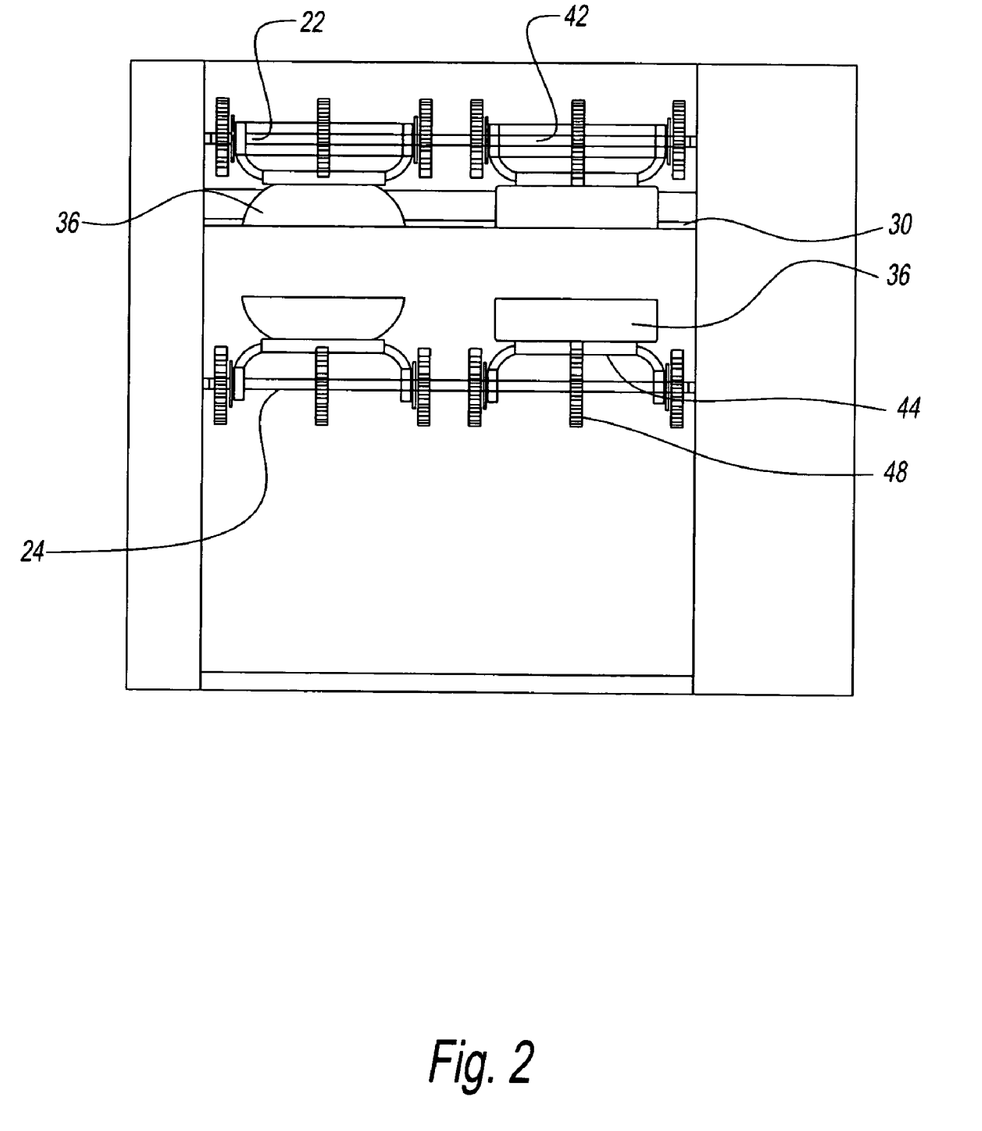
FIG. 2 is a front view of the combination toaster/caramelizer oven of FIG. 1.

Referring to FIGS. 1 and 2, a first embodiment of the combination toaster/caramelizer oven 10 of the present invention includes a pair of combination toaster/caramelizer oven modules 20 and 40 disposed side by side in a combination toaster/caramelizer oven housing 12. Module 20 includes a first upper endless conveyor 22 and a first lower endless conveyor 24. Module 40 includes a second upper endless conveyor 42 and a second lower endless conveyor 44. Modules 20 and 40 have a metallic plate or platen 30 disposed between upper conveyors 22 and 42 and lower conveyors 24 and 44. Infrared heater elements 26 heat food products 36 and function as rollers as part of upper conveyors 22 and 42 and lower conveyors 42 and 44. Infrared heater elements 26 also heat platen 30 to caramelize food products when they come in close contact with platen 30.

The upper conveyors 22 and 42 are adjustable toward and away from platen 30 so as to adjust for food products 36 of different heights. For example, cam adjusters 48 may be provided to raise and lower conveyors 22 and 42. Food products 36, which are being caramelized, are inserted at an upper inlet 16 (to the right in FIG. 1) and pressed against the platen 30 by upper conveyors 22 and 42 while being conveyed to an outlet 14 (to the left in FIG. 1). The infrared heater elements 26 heat platen 30 to a temperature that will caramelize food products 36. Infrared heater elements 26 are capable of heating much more quickly than traditional conductive heaters. Examples of food products that are caramelized include bun halves, flat bread, sandwich rolls and the like. When the food products 36 exit outlet 14, they slide down inner housing to a tray 46.

Food products 36, which are not being caramelized, are conveyed by lower conveyors 24 and 44 from an inlet 18 (to the right in FIG. 1) toward an outlet 38 (to the left in FIG. 1). Lower conveyors 24 and 44 are spaced from platen 30 so that those food products 36 being carried are not pressed against platen 30, but rather are heated by the infrared heater elements 26. Examples of food products for which may not require caramelizing include muffins, bagels, sliced bread and the like. When the food products exit the outlet, they slide down a frame portion to tray 46.

The height of inlets 16 and 18 are independently adjustable in the two modules 20 and 40 of FIGS. 1 and 2 to accommodate food products of different heights. For example, module 20 can be adjusted to caramelize bun tops and module 40 can be adjusted to caramelize bun bottoms. In addition, modules 20 and 40 may be angularly adjustable between the horizontal position shown in FIGS. 1 and 2 the vertical position to any desired angular position from zero to 90°.

Tray 46 catches food products 36 after they has been toasted or caramelized. Tray 46 incorporates vulcanized heating using resistive coils, electrical heating or lamps. Tray 46 has a Teflon® coating to prevent food products 36 from sticking. Tray 46 prevents food products 36 from cooling before they are consumed. Tray 46 is an optional feature particularly for commercial use.

It will be apparent to those skilled in the art that the combination toaster/caramelizer oven embodiment of FIGS. 1 and 2 may employ more or fewer modules than the two modules that are shown.

Figure 3:
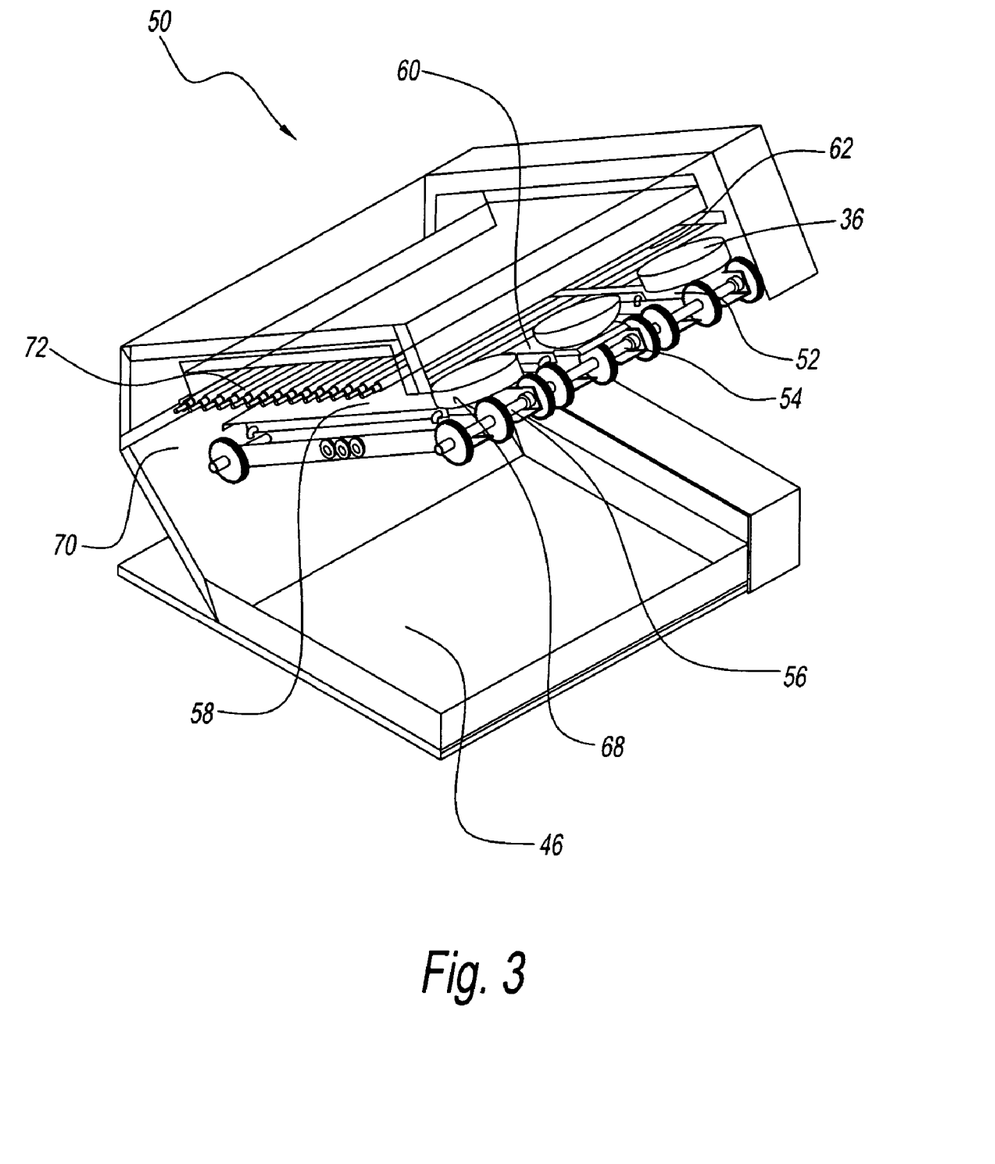
FIG. 3 is a perspective view of a second embodiment of the combination toaster/caramelizer oven of the present invention.
Figure 4:
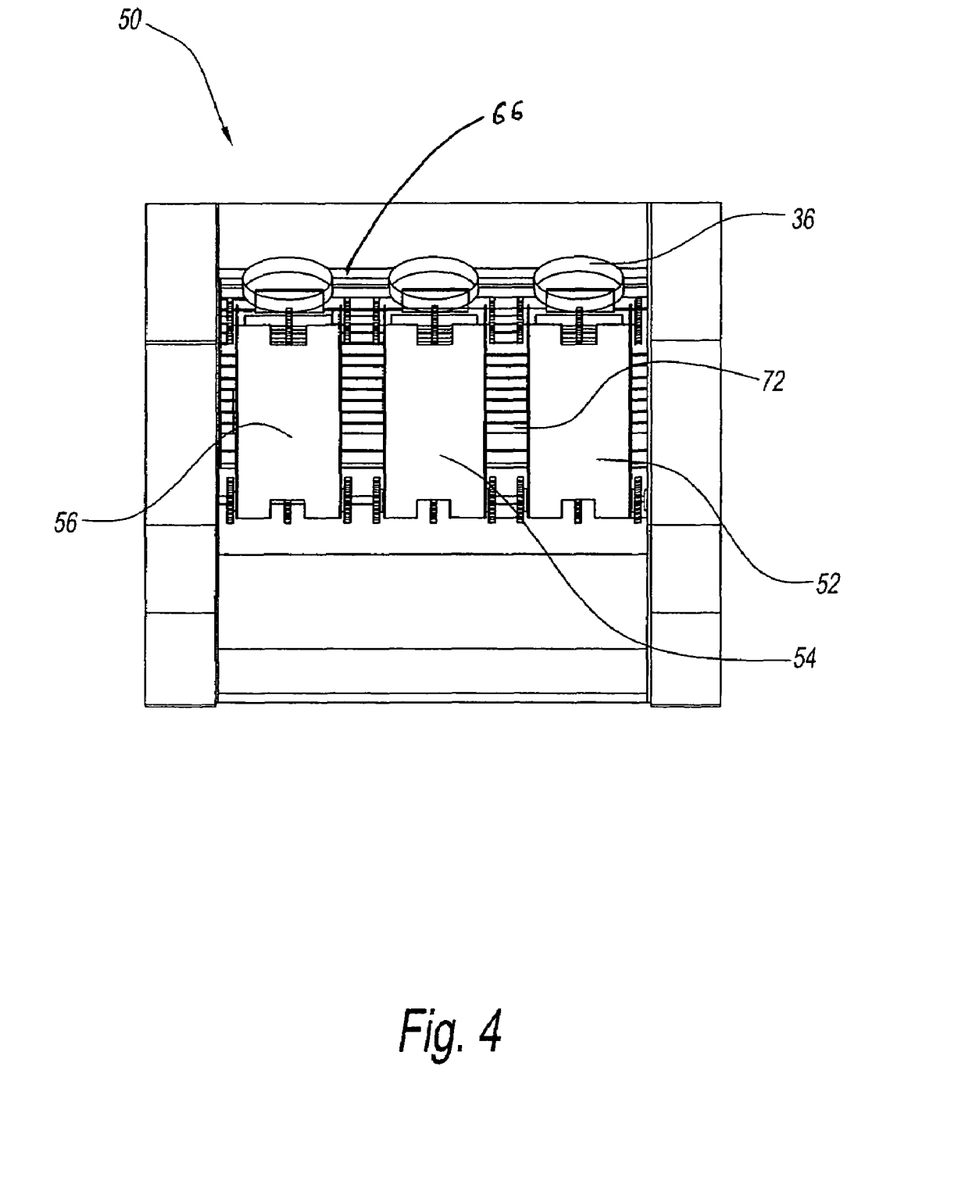
FIG. 4 is a front view of the combination toaster/caramelizer oven of FIG. 3.

Referring to FIGS. 3 and 4, a second embodiment of combination toaster/caramelizer oven 50 of the present invention includes three combination toaster/caramelizer oven modules 52, 54 and 56 disposed side by side and spaced from platen 66. Each module 52, 54 and 56 includes a conveyor 58, 60 and 62, respectively. Food products 36, which are being caramelized, are inserted at an inlet 68 (to the right in FIG. 3) and pressed against a surface of platen 66 by conveyors 58, 60 and 62 while being conveyed to an outlet 70 (to the left in FIG. 3). Platen 66 is located between infrared heating elements 72 above, and conveyors 58, 60 and 62 below that support and transport food products 36 from inlet 68 to outlet 70. When food products 36 exit outlet 70, they slide down a frame portion to tray 46. In this embodiment tray 46 is also heatable to maintain the temperature of food products before consumption.

The platen 66 is shaped and dimensioned for easy removal to expose the infrared heating elements 72 to the food products 36 for toasting. In the preferred embodiment, platen 66 is formed as a flat metallic plate that is easily removable. Platen 66 is inserted into brackets in housing 12 and held in place by it own weight. Alternatively, platen 66 can be formed as a U-shaped structure with the infrared heater being disposed in the U portion. Platen 66 is inserted in combination toaster/caramelizer oven frame and mates with mating parts in the combination toaster/caramelizer oven frame 12 and is secured by one or more suitable fastening elements (not shown). For removal, the fastening elements are unfastened, and the U-shaped structure is easily removed.

The inlet height is adjustable independently in the three modules to accommodate food products 36 of different sizes. In addition, the modules may be angularly adjustable to any desired angular position from zero to 90°, zero being the horizontal position and 90° being the vertical position.

It will be apparent to those skilled in the art that the combination toaster/caramelizer oven embodiment of FIGS. 3 and 4 may employ more or fewer modules than the three that are shown.

Figure 5A:
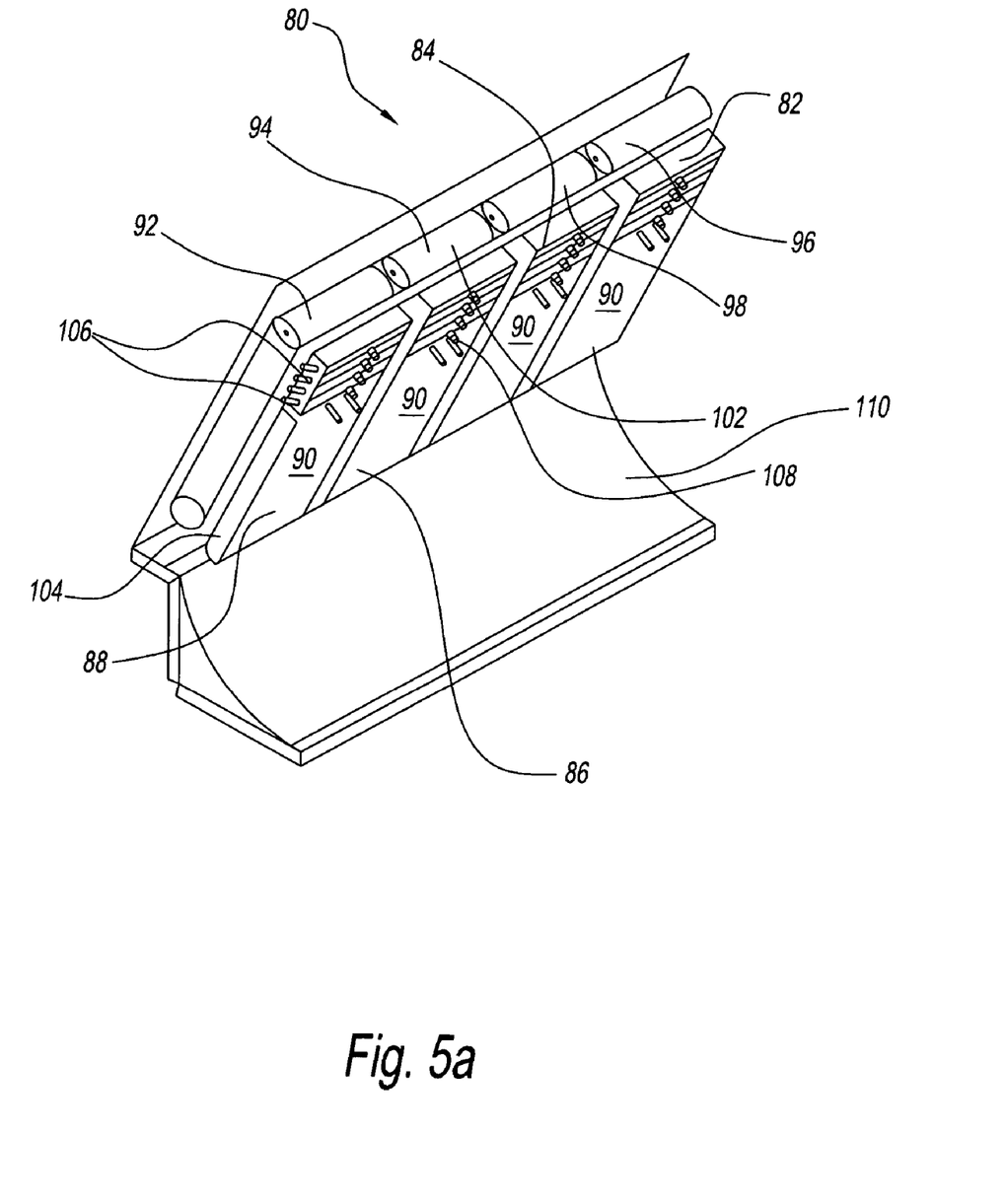
FIG. 5a is a perspective view of a third embodiment of the combination toaster/caramelizer oven of the present invention, having four combination toaster/caramelizer oven modules.

Referring to FIG. 5a, a third embodiment of the combination toaster/caramelizer oven 80 of the present invention includes four combination toaster/caramelizer oven modules 82, 84, 86 and 88 disposed side by side and spaced from platens 90. Each module 82, 84, 86 and 88 includes a conveyor 92, 94, 96 and 98, respectively, disposed in spaced apart relationship to platens 90. Food products 36, which are being caramelized, are inserted at an inlet 102 (to the top in FIG. 5a) and pressed against platen 90 by conveyor 92, 94, 96 and 98 while being conveyed to an outlet 104 (to the bottom in FIG. 5). Platens 90 are heated by an infrared heater elements 106 that may be disposed on the opposite side thereof with respect to the caramelizing side as shown in FIGS. 3 and 4. Alternatively, the infrared heater elements 106 are embedded in platens 90. When food products 36 exit outlet 104, they slide down inner housing 110.

Figure 5B:
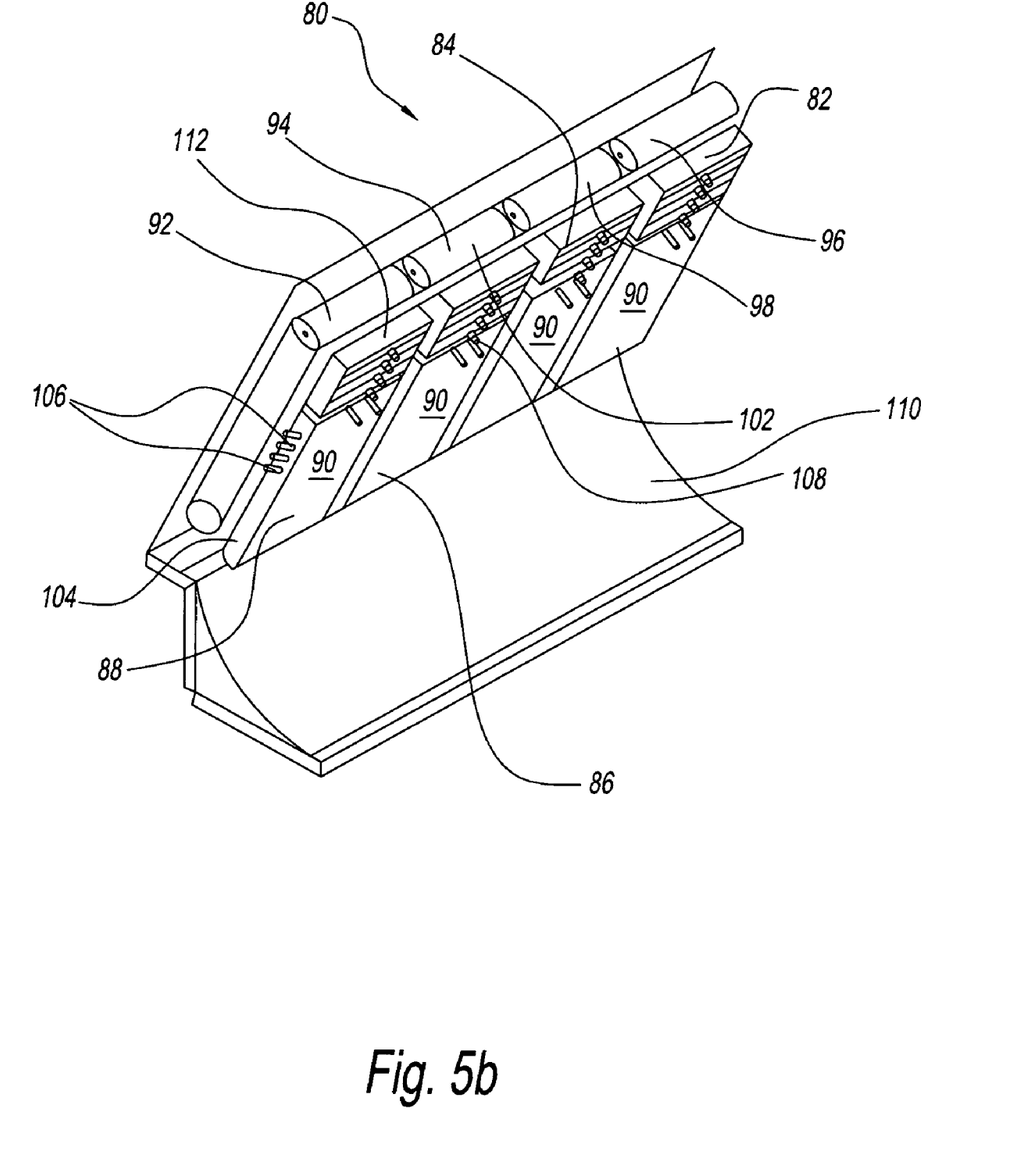
FIG. 5b is a perspective view of the third embodiment of the combination toaster/caramelizer oven of the present invention, having separate moisture portions in the four combination toaster/caramelizer oven modules.

In a region of the platens 90 adjacent inlet 102, one or more steam injectors 108 are disposed in the platen to inject moisture into the food products 36. One or more steam injectors 108 are located only at the portion of platens 90 near inlet 102. One or more steam injectors 108 are centrally located beneath platens 90 to provide even distribution of moisture in food product 36. The caramelizing process then occurs along the remainder of platens 90 towards outlet. Moisture injection is used to maintain moisture levels in bread during the caramelizing process. Additionally, moisture injection may, optionally, be used to inject additional flavors into bread using spices in the water. Moisture injection refreshes food products that may become dry if they are not immediately consumed. In this embodiment, platens 90 are not removable. Alternatively, as shown in FIG. 5b, steam injectors 108 are located on a separate unit 112 from infrared elements 106.

In this embodiment, the inlet height is adjustable independently in the three modules to accommodate food products 36 of different sizes. In addition, the modules may be angularly adjustable to any desired angular position from zero to 90°, zero being the horizontal position and 90° being the vertical position.

It will be apparent to those skilled in the art that the combination toaster/caramelizer oven embodiment of FIG. 5 may employ more or fewer modules than the four that are shown.

In each of the three embodiments, the width of the modules can be varied to accommodate food products of various shapes. For example, an elongated roll may be arranged side ways on a wider conveyor.

Figure 6:
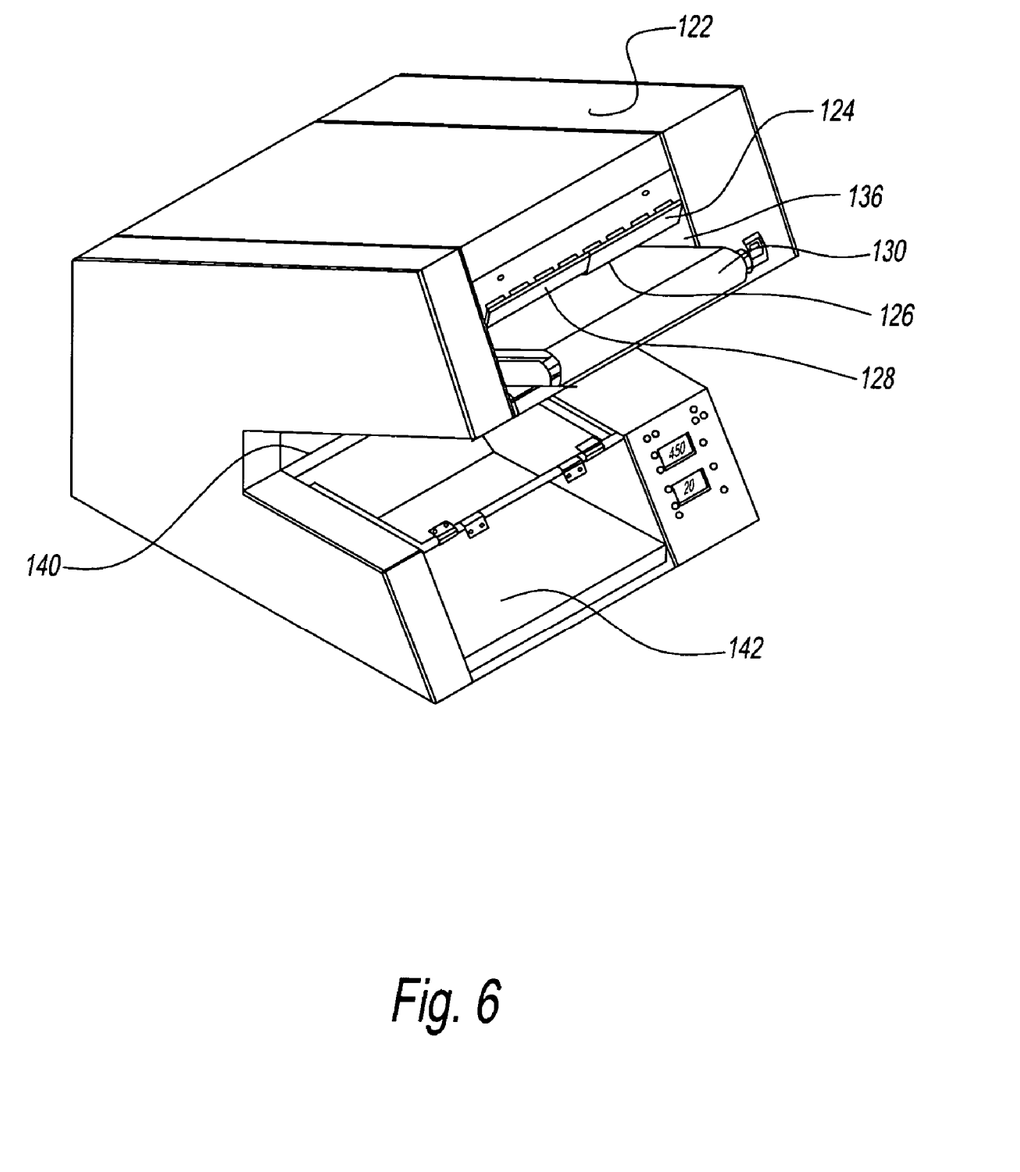
FIG. 6 is a perspective view of a fourth embodiment of the combination toaster/caramelizer oven of the present invention.
Figure 7:
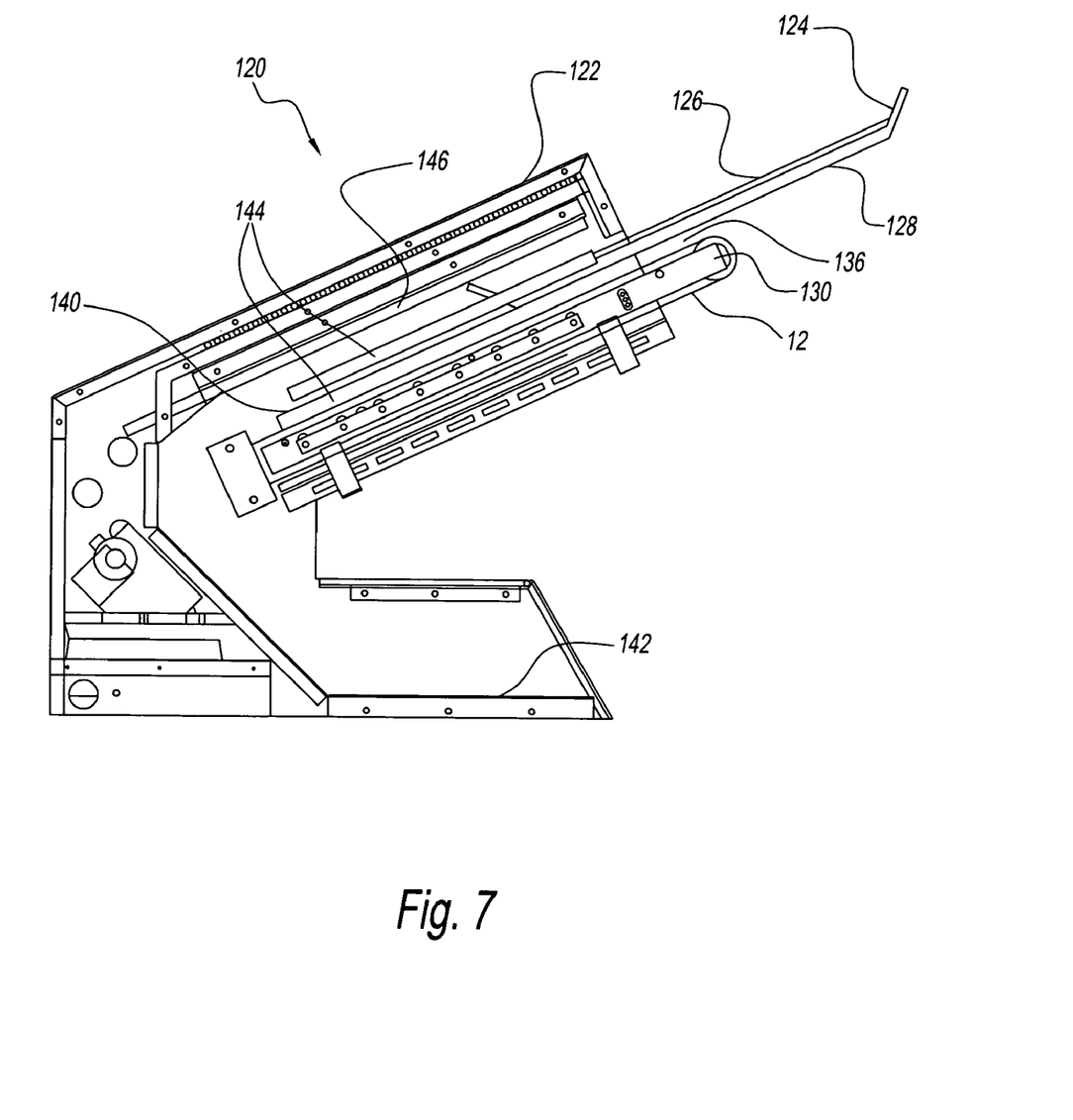
FIG. 7 is a cross-sectional view of the combination toaster/caramelizer oven of the embodiment of FIG. 6.
Figure 8:
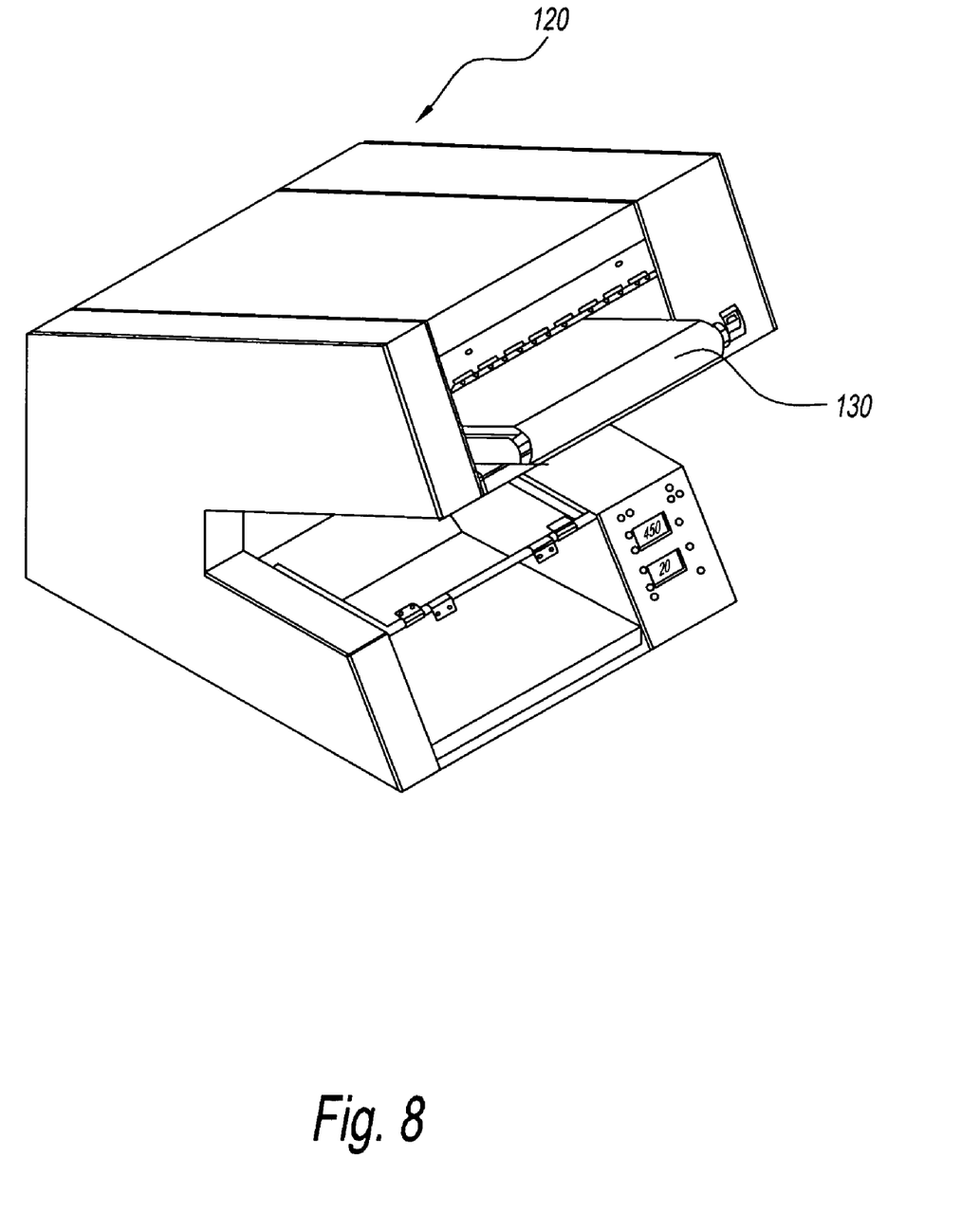
FIG. 8 is a view of the combination toaster/caramelizer oven of the embodiment of FIG. 6, with the platen removed.

A fourth embodiment of combination toaster/caramelizer oven is shown in FIGS. 6 through 8. Referring to FIG. 6, combination toaster/caramelizer oven 120 has a housing 122, a platen 124 and an endless conveyor 130. Housing 122 also has in inlet 136 into which food products are placed for transport on conveyor 130 from inlet 136 to outlet 140. Combination toaster/caramelizer oven 120 also has a heating tray 142 onto which food products fall after being either toasted or caramelized. Platen 124 has variable thickness to accommodate food products of different heights. For example, side 126 has a lower surface to caramelize bun bottoms and side 128 has a higher surface to accommodate bun tops, which are generally thicker.

FIG. 7 shows a cross-section view of combination toaster/caramelizer oven 120, in which platen 124 is in a partially removed position. Platen 124 is held in position under its own weight as it rests against brackets 144 connected to the side of housing 122. Infrared heater element 146 is placed above platen 124. When caramelizing is needed for food products, platen 124 is installed. Alternatively, when toasting is desired, platen 124 is removed and food products on conveyor 130 are toasted by heater element 146.

A method for toasting food products in the combination toaster/caramelizer oven of the present invention will be described with regard to FIG. 5. Food products 36 are placed in inlet 102 on any of platens 90 beneath conveyors 92, 94, 96 or 98. Flat food products are transported form inlet 102 to outlet 104 by movement of conveyors 92, 94, 96 and 98. Moisture is provided to food products 36 when they are placed on platens 90 by steam injectors 108. Steam injectors 108 are located centrally in platens 90. Steam is provided to food products 36 before the caramelizing process begins. Once food products 36 have been transported along platens 90 to outlet 104, the caramelization is completed and the food products slide down inner housing for further preparation to be consumed. FIG. 8 shows combination toaster/caramelizer oven 120 with platen 124 removed.

The present invention having been thus described with particular reference to the preferred forms thereof, it will be obvious that various changes and modifications may be made therein.

What is claimed is:

1. A combination toaster/caramelizer oven for treating food products comprising:
   a housing;
   a plurality of conveyor modules disposed side by side, wherein each of said modules comprises a first conveyor and a second conveyor spaced apart from one another;
   a single platen disposed between the first and second conveyors of each of said conveyor modules, wherein each of said conveyor modules is operable to convey food products through said housing along a plurality of side by side toasting paths; and
   a source of thermal energy disposed to heat said food products in a non-contact manner and in a contact manner by providing thermal energy that heats said platen.

2. The combination toaster/caramelizer oven according to claim 1, wherein said source of energy comprises at least one heating element that is an infrared heating element.

3. The combination toaster/caramelizer oven according to claim 1, wherein each of said conveyors is an endless belt-type conveyor.

4. The combination toaster/caramelizer oven according to claim 1, wherein said first toasting path comprises a first product inlet and a first product outlet opposite said first product inlet and said second toasting path comprises a second product inlet and a second product outlet opposite said second product inlet.

5. The combination toaster/caramelizer oven according to claim 1, wherein said platen is removable, and wherein said housing further comprises at least one guide rail that allows for installation and removal of said removable platen.

6. The combination toaster/caramelizer oven according to claim 1, wherein said conveyor modules, said source of energy and said platen are located to provide for each conveyor module a spacing that is adjustable so that food products of different heights can be simultaneously treated.

7. The combination toaster/caramelizer oven according to claim 1, further comprising an outlet tray which is operably associated with said housing to receive said food products exiting said toasting paths.

8. The combination toaster/caramelizer oven according to claim 7, wherein said outlet tray is heated.

9. A combination toaster/caramelizer oven for treating food products comprising:
   a housing;
   at least one conveyor that conveys said food products through said housing;
   a source of energy disposed in a first location to provide thermal energy to said food products, wherein said source of energy comprises at least one heating element that is an infrared heating element; and
   a platen disposed in a second location separate from said first location to be heated by said thermal energy and to provide a contact surface to said food products for caramelizing, wherein said housing comprises a surface located above said platen, and wherein said infrared heating element is fixedly secured to said surface of said housing.

10. A combination toaster/caramelizer oven for treating food products comprising:
    a housing;
    at least one conveyor that conveys said food products through said housing;
    a source of energy disposed to provide thermal energy to said food products; and
    a platen disposed in a location to be heated by said thermal energy and to provide a contact surface to said food products for caramelizing, and wherein said combination toaster/caramelizer oven is angularly adjustable from a horizontal position to a vertical position.

11. A combination toaster/caramelizer oven for treating food products comprising:
    a housing;
    at least one conveyor that conveys said food products through said housing;
    a source of energy disposed in a first location to provide thermal energy to said food products; and
    a platen disposed in a second location separate from said first location to be heated by said thermal energy and to provide a contact surface to said food products, wherein said thermal energy source heats said platen to a temperature that caramelizes said food products, wherein said source of energy comprises at least one heater element disposed in a roller of said conveyor.

* * * * *